United States Patent
Sheidler et al.

(10) Patent No.: US 6,655,351 B2
(45) Date of Patent: Dec. 2, 2003

(54) VEHICLE ENGINE CONTROL

(75) Inventors: Alan David Sheidler, Moline, IL (US); Kyle John Tingle, Colona, IL (US); Kenny L. Hennings, Tripoli, IA (US); William A. Brockmann, Moline, IL (US); Mark Peter Sahlin, Bettendorf, IA (US)

(73) Assignee: Deere & Company, Moline, IL (US)

( * ) Notice: Subject to any disclaimer, the term of this patent is extended or adjusted under 35 U.S.C. 154(b) by 163 days.

(21) Appl. No.: 09/999,725

(22) Filed: Oct. 24, 2001

(65) Prior Publication Data

US 2003/0075145 A1 Apr. 24, 2003

(51) Int. Cl.$^7$ ................................................ F02D 7/00
(52) U.S. Cl. ..................................................... 123/396
(58) Field of Search ................................ 123/395, 396, 123/399, 319, 343, 349

(56) References Cited

U.S. PATENT DOCUMENTS

| | | | |
|---|---|---|---|
| 4,522,553 A | 6/1985 | Nelson et al. .............. | 414/526 |
| 4,542,802 A | 9/1985 | Garvey et al. | |
| 5,586,033 A | 12/1996 | Hall ......... | 364/424.07 |
| 5,686,671 A | 11/1997 | Nelson et al. ............ | 73/861.73 |
| 5,878,557 A | 3/1999 | Wyffels et al. .............. | 56/13.5 |
| 6,115,115 A | 9/2000 | Skarie et al. .................. | 356/73 |
| 6,234,144 B1 * | 5/2001 | Yamaguchi et al. ........ | 123/399 |

FOREIGN PATENT DOCUMENTS

| | | | |
|---|---|---|---|
| DE | 199 19 682 A 1 | 11/2000 | |
| EP | 0631906 A1 | 1/1995 | ........... B60R/16/02 |
| EP | 0 950 346 A1 | 10/1999 | |
| JP | 58057037 | 4/1983 | |
| JP | 10155341 | 6/1998 | |
| JP | 10225225 | 8/1998 | |

\* cited by examiner

*Primary Examiner*—Bibhu Mohanty
(74) *Attorney, Agent, or Firm*—Wilhelm Law Service; Thomas D. Wilhelm (57) ABSTRACT

An engine control unit, and method of use, uses a power curve or algorithm to pro-actively adjust fuel flow rate to an engine, optionally in combination with a reactive power curve or algorithm, thereby to adjust engine power, in anticipation of changes in loads being imposed on the engine, as well as to respond to engine speed changes. The ECU has a power curve or algorithm stored in memory which responds to certain predetermined operating conditions other than sensed engine speed, by providing a sequence of pro-active change inputs, at predetermined rates of change, in rate of delivery of fuel to the engine combustion chambers, independent of engine speed change, thereby to produce pro-active incremental changes in power output of the engine. Such pro-active incremental power changes are effected in anticipation of changes in load demand on the engine, and correspond generally with expected incrementally progressive changes in load demand on the engine. In preferred embodiments, the power curve or algorithm includes a first upwardly sloping line representing small increment increases in engine power, a second step change increase in engine power, a third downwardly sloping line representing small incremental decreases in engine power, and a fourth relatively greater magnitude step change decrease in engine power. The pro-active change input signals can be combined with reactive change input signals to make respective combination change input signals which take into consideration a variety of operating parameters, including engine speed changes.

23 Claims, 3 Drawing Sheets

VEHICLE ENGINE CONTROL

BACKGROUND OF THE INVENTION

This invention is directed to combines and other off-road vehicles powered by internal combustion engines, wherein one or more auxiliary power demands are periodically placed on the engine. The invention is further directed to such vehicles wherein the engine is controlled by an electronic engine control unit as part of an electronic engine control system.

Combines are large agricultural machines used to harvest grain or other crop material from supporting plants. Such harvesting of the crop material includes e.g. cutting plants containing such crop material or otherwise severing the crop material from the plant, threshing and separating the crop material from the plant material, and cleaning the crop material from the supporting plant material and other debris with which the crop material may be associated. Such combine typically has a grain tank for temporarily storing harvested crop material. The combine also has an unloading auger for unloading the crop material from the grain tank to a grain cart or truck. Combines may further be provided with additional crop processing assemblies such as straw choppers and chaff spreaders. Combines are typically embodied in self-propelled vehicles.

A typical combine uses a single engine to power all machine functions, including the various operations noted above, in addition to powering movement of the vehicle from place to place in the normal course of operation. Thus, the load on the engine varies in accord with the loads applied by the various assemblies which are activated, operated, and deactivated during routine use of the machine.

A typical such combine operates at a set engine speed. Typical combines have two or three speed settings which correspond, for example, to "low" speed, "medium" speed, and "high" speed. Each of such speeds has a target engine rotation speed. For example, "low" speed can have a target engine speed of about 1200 rpm. "Medium" speed can have a target engine speed of about 1600 rpm. "High" speed can have a target engine speed of about 2200 rpm.

The speed setting is set by the vehicle operator. Once the vehicle operator selects a speed setting, an electronic engine control unit (ECU) controls the engine speed according to the selected setting, primarily by dynamically adjusting the quantity of fuel injected into the engine cylinders. When the operator makes a different speed selection, the engine control unit responds by changing the quantity of fuel being injected into the cylinders, in order to maintain the engine speed at the predetermined target engine speed.

A primary task of the ECU is to dynamically maintain the engine speed constant in the face of whatever loads are being imposed on the engine. As a load is imposed which causes the engine rpm to decrease below a first predetermined speed, the engine control unit increases the quantity of fuel being injected into the cylinders, in order to increase the amount of power being developed by the engine, and thus to maintain engine speed within a target range between the first and second predetermined speeds.

Similarly, as a load is removed or decreased which causes the engine speed to increase above a second predetermined level, the engine control unit decreases the quantity of fuel being injected into the cylinders, in order to decrease the amount of power being developed by the engine, thus to maintain engine speed within the target range between the first and second predetermined speeds.

Thus, conventional engine control units respond to engine speed changes by changing the fuel flow to the cylinders in attempting to maintain engine speed within a range of predetermined engine speeds.

While the ECU thus responds reactively, step changes in engine loading can cause substantial decreases in engine speed before the engine control unit can respond to the dynamically changing situation.

U.S. Pat. No. 4,522,553 issued Jun. 11, 1985 to Nelson et al teaches boosting engine power by a predetermined amount to a fixed higher level when the unloading auger is switched on, and correspondingly reducing the engine power by a corresponding predetermined amount to a fixed lower level when the unloading auger is switched off.

However, the wide range of operating systems which consume power in the combine results in a constantly varying load demand being placed on the engine and engine drive train. To the extent multiple load demands increase simultaneously, to the extent a load demand increases stepwise by a substantial amount, the engine may become overloaded such that the engine speed drops below an acceptable speed. When the engine speed drops below such acceptable speed, engine systems such as engine cooling and lubrication can be affected so as to reduce engine wear life. In addition, the ability of the engine to sustain operation, and/or to recover to desired operating speed, when an excessive load is applied, may be jeopardized. Where an unexpected heavy load is coupled with a load change which can be predicted, the combined affect of the predictable load and the unexpected load can have a negative affect on overall engine operation, or user perception of engine operation. However, if certain load changes can be predicted and anticipated, and engine power adjusted pro-actively to such anticipated loads, the detrimental coupling affect of concurrent unexpected load increases can be lessened or avoided.

It is an object of the invention to provide an engine power control system, including an electronic engine control unit and a fuel system including a fuel supply pump and adjustment apparatus which, in combination, make incremental changes in power output of the engine in anticipation of incrementally progressive changes in load demand on the engine.

It is another object to provide an engine power control system, including an electronic engine controller and a fuel system including a fuel supply pump and adjustment apparatus which, in combination makes incremental changes in power output of the engine in anticipation of load demands on the engine, in combination with making further changes in power output of the engine in reaction to sensed engine-loading changes which are not satisfied by the anticipatory changes.

Yet another object is to provide methods of providing pro-active, anticipatory changes in inputs to engine power.

Still another object is to provide methods of providing both pro-active anticipatory changes in inputs to engine power and reactive changes in inputs to engine power in response to sensed engine-loading changes which are not satisfied by the pro-active anticipatory changes.

SUMMARY OF THE DISCLOSURE

In this invention, an engine control unit uses a power curve or an algorithm for a power curve to pro-actively adjust fuel flow rate to an internal combustion engine, thereby to adjust engine power, in anticipation of changes in loads being imposed on the engine. In the alternative, the engine control unit can combine input from such pro-active algorithm with input from a reactive algorithm, thus to develop a combined fuel flow rate control signal to fuel injectors at the engine.

A first family of embodiments of the invention comprehends, in an engine-driven vehicle, an engine power control system controlling the power output of the engine. The engine power control system comprises a fuel system including a fuel supply pump and adjustment apparatus which adjusts the rate at which fuel is delivered to combustion chambers of the engine in response to control signals supplied to an input of the adjustment apparatus, thereby to adjust power output of the engine; and an electronic engine controller capable of generating, and delivering to the adjustment apparatus, a series of control signals which cause the adjustment apparatus to change the rate at which fuel is delivered to the combustion chambers thereby to change the power output of the engine. The electronic engine controller has at least one of a power curve or an algorithm for a power curve stored in memory which, responsive to certain predetermined operating conditions other than sensed engine speed, provides a sequence of pro-active change inputs, at predetermined rates of change, in rate of delivery of fuel to the engine combustion chambers, at points in time based on timing of occurrence of the respective operating conditions, thereby to produce pro-active incremental changes in power output of the engine. Such pro-active incremental power changes are effected in anticipation of changes in load demand on the engine, and the pro-active incremental power changes correspond generally with expected incrementally progressive changes in load demand on the engine.

In preferred embodiments, the vehicle has an auxiliary function, for example a grain unloading function, powered by the engine, the auxiliary function being capable of being operated while the vehicle is moving. The engine power control system further comprises a switch operable for activating and deactivating the auxiliary function in a step-wise manner. The stored power curve or algorithm for the power curve, in response to activation and deactivation of the switch, provides pro-active relatively greater step change inputs in quantity of fuel delivered to the engine combustion chambers, at points in time based on timing of the activations and deactivations of the switch, while simultaneously and additively providing pro-active relatively smaller incremental change inputs in quantity of fuel delivered to the engine combustion chambers at points in time based on timing of the respective certain predetermined operating conditions other than the auxiliary function. Thus, the power curve or algorithm so employed by the electronic engine controller provides an additive combination of pro-active relatively greater step change inputs, and proactive relatively smaller increment change inputs, in power output of the engine in anticipation of changing load demands on the engine.

In preferred embodiments, the power curve or algorithm is responsive to one or more real-time operating conditions selected from the group consisting of mass quantity of grain in a grain tank on the vehicle, grain tank mass fill rate, grain moisture, density of grain being received in the grain tank, and changes in slope of terrain over which the vehicle is moving.

Optionally, a second predetermined operating condition to which the power curve or algorithm is responsive comprises the auxiliary function and the auxiliary function comprises activation and deactivation of an unloading auger unloading grain from the grain tank, whereby pro-active step-wise changes in power are effected based on anticipated load changes on the engine related to starting, operating, and stopping operation of the unloading auger by operation of the switch.

In preferred embodiments, the power curve or algorithm includes (i) a first upwardly sloping line representing a first set of small incremental increases in engine power, over a first period of time, in anticipation of increasing grain load in a grain tank on the vehicle over the respective period of time, (ii) a second relatively greater magnitude step change increase in engine power effected in anticipation of increased load on the engine and implemented when a grain unloading auger on the vehicle is activated to unload grain from the grain tank, (iii) a third relatively smaller, downwardly sloping line representing a second set of small incremental decreases in engine power over a second period of time, in anticipation of decreased load on the engine over a subsequent period of time while the auger is unloading grain from the grain tank, and (iv) a fourth relatively greater magnitude step change decrease in engine power effected in anticipation of decreased load on the engine and implemented when the grain unloading auger is deactivated.

A second set of embodiments of the invention comprehends, in an engine-driven vehicle, an engine power control system controlling the power output of the engine. The engine power control system comprises a fuel system including a fuel supply pump and adjustment apparatus which adjusts the rate at which fuel is delivered to combustion chambers of the engine in response to control signals supplied to an input of the adjustment apparatus, thereby to adjust power output of the engine; and an electronic engine controller capable of generating, and delivering to the adjustment apparatus, a series of control signals which cause the adjustment apparatus to change the rate at which fuel is delivered to the combustion chambers thereby to change the power output of the engine. The electronic engine controller has at least one of a power curve or an algorithm for a power curve stored in memory. The power curve or algorithm changes quantity of fuel delivered to the combustion chambers of the engine according to a combination of (i) a first parameter defining pro-active change inputs based on anticipated engine loading changes, and (ii) a second parameter defining reactive change inputs responsive and reactive to sensed engine-loading changes not satisfied by the first proactive parameter.

In preferred embodiments, the vehicle has an auxiliary function powered by the engine. The auxiliary function is capable of being operated while the vehicle is moving. The engine power control system further comprises a switch operable for activating and deactivating the auxiliary function in a step-wise manner. The stored power curve or algorithm for the power curve, in response to activation and deactivation of the switch, provides pro-active relatively greater step change inputs in quantity of fuel delivered to the engine combustion chambers based on the first parameter, at points in time based on timing of the activations and deactivations of the switch, while simultaneously and additively providing pro-active relatively smaller incremental change inputs in quantity of fuel delivered to the engine combustion chambers based on the first parameter, at points in time based on timing of certain pre-determined operating conditions other than the auxiliary function. Correspondingly, the power curve or algorithm so employed by the electronic engine controller provides an additive combination of pro-active relatively greater step change inputs based on the first parameter, proactive relatively smaller increment change inputs based on the first parameter, and reactive change inputs based on sensed engine-loading, in dynamically controlling power output of the engine.

A third family of embodiments are implemented in methods wherein, in an engine-driven vehicle wherein an engine power control system comprises a fuel system including a fuel supply pump and adjustment apparatus which adjusts the rate at which fuel is delivered to combustion chambers of the engine in response to control signals applied to an input of the adjustment apparatus, thereby to adjust power output of the engine, the vehicle including an electronic engine controller capable of generating, and delivering to the adjustment apparatus, a series of control signals which cause the adjustment apparatus to change the rate at which fuel is delivered to the combustion chambers thereby to change the power output of the engine, the electronic engine controller having at least one of a power curve or an algorithm for a power curve stored in memory, effective to control fuel input to the engine, a method of controlling power output of the engine. The method comprises providing a sequence of pro-active change inputs of progressively changing magnitude, in quantity of fuel delivered to the engine combustion chambers, at points in time based on timing of occurrence of the respective operating conditions, thereby producing pro-active changes, of progressively and incrementally changing magnitude, in power output of the engine in anticipation of expected changes in load demand on the engine, and which pro-active power output changes generally correspond with expected progressive changes in load demand on the engine.

In some embodiments, the vehicle has an auxiliary function powered by the engine. The auxiliary function is capable of being operated while the vehicle is moving. The engine power control system further comprises a switch operable for activating and deactivating the auxiliary function in a step-wise manner. The method further comprises, in response to activation and deactivation of the switch, providing pro-active relatively greater step change inputs in quantity of fuel delivered to the engine combustion chambers, at points in time based on timing of the activations and deactivations of the switch, while simultaneously and additively providing pro-active relatively smaller incremental change inputs in quantity of fuel delivered to the engine combustion chambers at points in time based on timing of the respective certain determined operating conditions other than the auxiliary function. Thus, the invention provides an additive combination of pro-active relatively greater step change inputs, and proactive relatively smaller increment change inputs, in power output of the engine in anticipation of changing load demands on the engine.

The method preferably includes sensing slope of terrain immediately ahead of the vehicle, and providing, as a component of the pro-active change inputs, a change increment responsive to the sensed slope of the terrain.

Other embodiments of the invention are implemented in methods wherein, in an engine-driven vehicle wherein an engine power control system comprises a fuel system including a fuel supply pump and adjustment apparatus which adjusts the rate at which fuel is delivered to combustion chambers of the engine in response to control signals applied to an input of the adjustment apparatus, thereby to adjust power output of the engine, the vehicle including an electronic engine controller capable of generating, and delivering to the adjustment apparatus, a series of control signals which cause the adjustment apparatus to change the rate at which fuel is delivered to the combustion chambers thereby to change the power output of the engine, the electronic engine controller having at least one of a power curve or an algorithm for a power curve stored in memory, effective to control fuel input to the engine. The method comprises providing a sequence of change inputs, in quantity of fuel delivered to the engine, according to a combination of (i) a first parameter defining pro-active change inputs based on anticipated engine loading changes, and (ii) a second parameter defining reactive change inputs responsive and reactive to sensed engine loading changes not satisfied by the first pro-active parameter.

In preferred embodiments, with an auxiliary function powered by the engine, and capable of being operated while the vehicle is moving, the engine power control system further comprises a switch for activating and deactivating the auxiliary function in a step-wise manner. The method further comprises, in response to activation and deactivation of the switch, providing pro-active relatively greater step change inputs in quantity of fuel delivered to the engine based on the first parameter, at points in time based on timing of the activations and deactivations of the switch, while simultaneously and additively providing pro-active relatively smaller incremental change inputs in quantity of fuel delivered to the engine combustion chambers based on the first parameter at points in time based on timing of the respective certain determined operating conditions other than the auxiliary function, thereby providing an additive combination of pro-active relatively greater step change inputs based on the first parameter, proactive relatively smaller increment change inputs based on the first parameter, and reactive change inputs based on the second parameter of sensed engine-loading, in dynamically-controlling power output of the engine.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
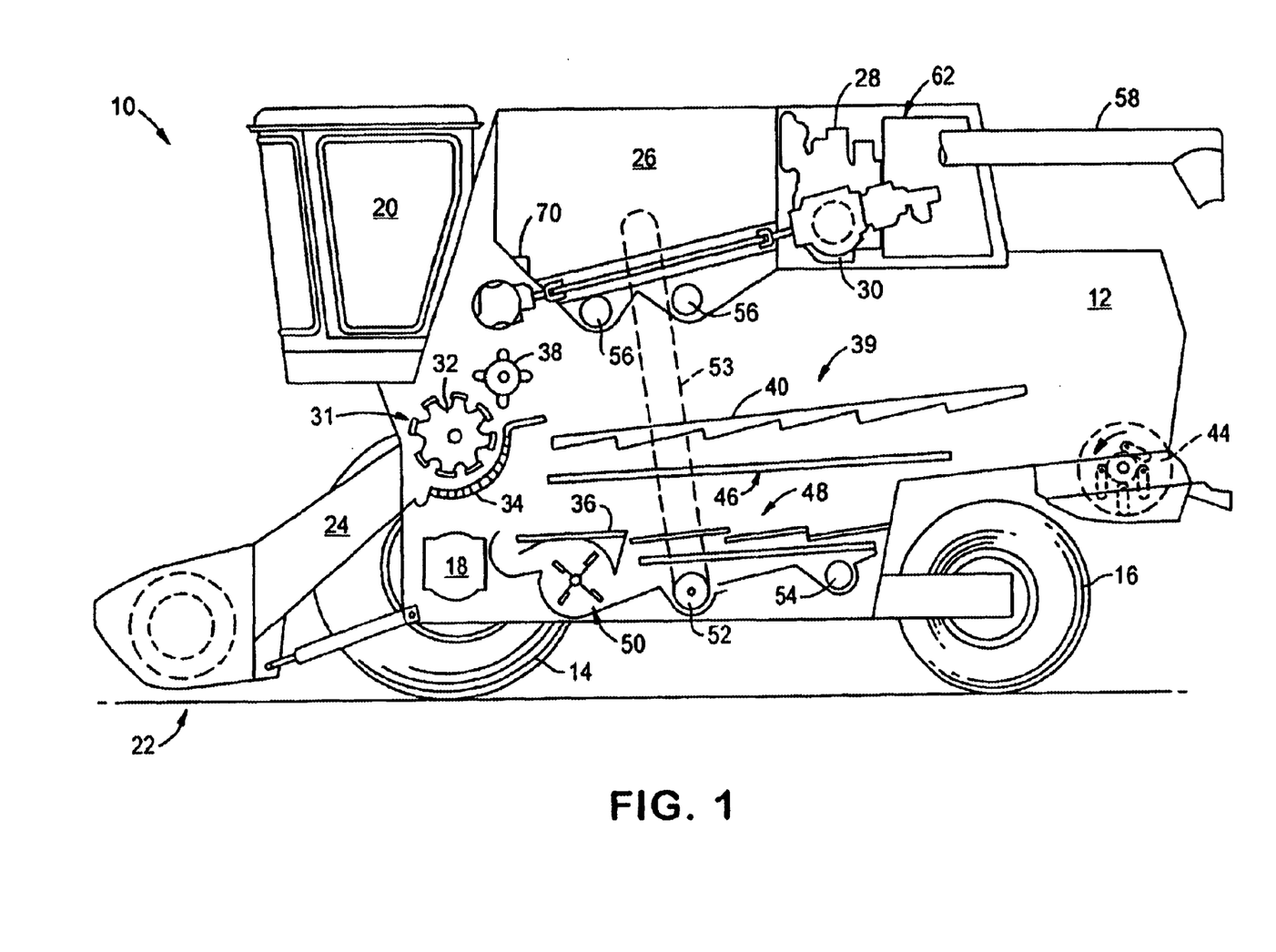
FIG. 1 shows a semi-schematic side view of a combine which employs an engine power control system of the invention.

FIG. 1 illustrates an agricultural combine 10 having a chassis 12 and ground engaging wheels 14 and 16. Forward ground engaging wheels 14 are driven by hydrostatic motor 18 located between the wheels. An operator seated in operator control cab 20 controls the operation of the combine. Harvesting platform 22 extends forward from the chassis and is used for severing the crop material from plants in the field which produce such crop material, and for ingesting the so-severed crop material into the combine. After the crop material is ingested into the combine, the crop material is directed through feeder house 24 and into those portions of the combine which separate the crop material from unwanted portions of crop residue such as plant material other than the crop material, and weeds.

While the invention is described herein in terms of harvesting grain, it should be understood that the invention can apply equally well to implementations employing other vehicles or wherein crop materials other than grain are being harvested.

Clean grain tank 26 is located behind the operator's cab at the top of the combine. Behind tank 26 is transversely-mounted internal combustion engine 28, for example a diesel engine, which is the prime mover of the combine, powering the propulsion assembly, as well as various processing assemblies which process the crop material which passes through the combine. Engine 28 is provided with a driving assembly 30 for powering the various mechanical usage assemblies. Further description of a conventional such drive assembly is contained in U.S. Pat. No. 4,843,803, assigned to the assignee of the present application, and which is incorporated herein by reference.

Threshing assembly 31 and separator 39 are located between side sheets of the combine, which side sheets form part of chassis 12. The threshing and separating assemblies separate grain or other crop material from e.g. straw and chaff, or other plant or other material which passes through the combine. Such other plant or other material can include, for example and without limitation, weeds and weed seeds, soil, and other detritus picked up by the harvesting platform from at or near the surface of the soil.

The feeder house directs the harvested crop material to threshing assembly 31 which comprises a rotating transverse threshing cylinder 32, a transverse concave 34, and a rotating beater 38. As the crop passes between cylinder 32 and concave 34, grain and chaff fall through the concave to a pan 36 and the remaining plant material is advanced to beater 38.

After threshing, the straw in the crop is advanced to separator 39. The main elements of the separator are straw walkers 40. From beater 38, the crop material is advanced to oscillating straw walkers 40 which direct the straw to the rear of the combine where the straw is received by straw chopper 44. The straw chopper in turn chops the remaining crop material into smaller components before the straw is discharged to the field.

Grain and chaff falling through the straw walkers falls onto an oscillating slanted pan 46 which directs the grain and chaff to pan 36. The grain and chaff are directed from pan 36 by overhead auger assemblies (not shown) to a cleaning shoe assembly 48 which is used to separate chaff from grain.

The grain and chaff falling onto the chaffer and sieve of the cleaning shoe assembly encounter an air stream from a fan 50 which blows the lighter chaff out the rear of the combine while the heavier grain falls through the cleaning shoe assembly and into a clean grain receiving auger 52. Auger 52 directs the clean grain to a clean grain elevator 53 which in turn conveys the grain to clean grain tank 26. Tailings, namely unthreshed heads of grain, fall into a tailings auger 54 which directs the unthreshed heads back to the threshing cylinder and concave. When the clean grain tank is to be unloaded, transverse unloading augers 56 direct the grain to the side of the tank from where it comes into contact with an unloading auger 57 (FIG. 2) which directs the clean grain through an unloading tube 58, out of the combine.

As discussed above, various crop processing assemblies are powered by internal combustion engine 28. Engine 28 is connected to electronic engine control unit 60. In turn, the electronic engine control unit is in communication with various sensors and operating systems, including a Controller Area Network (CAN) bus 61, thereby collecting various data relating to the parameters under which the combine is operating at any given point in time. Such controller area network and engine control unit communicate and otherwise cooperate with each other in monitoring and controlling various operating systems in the combine while providing sufficient power to such operating systems to maintain routine operation of such operating systems.

Figure 2:
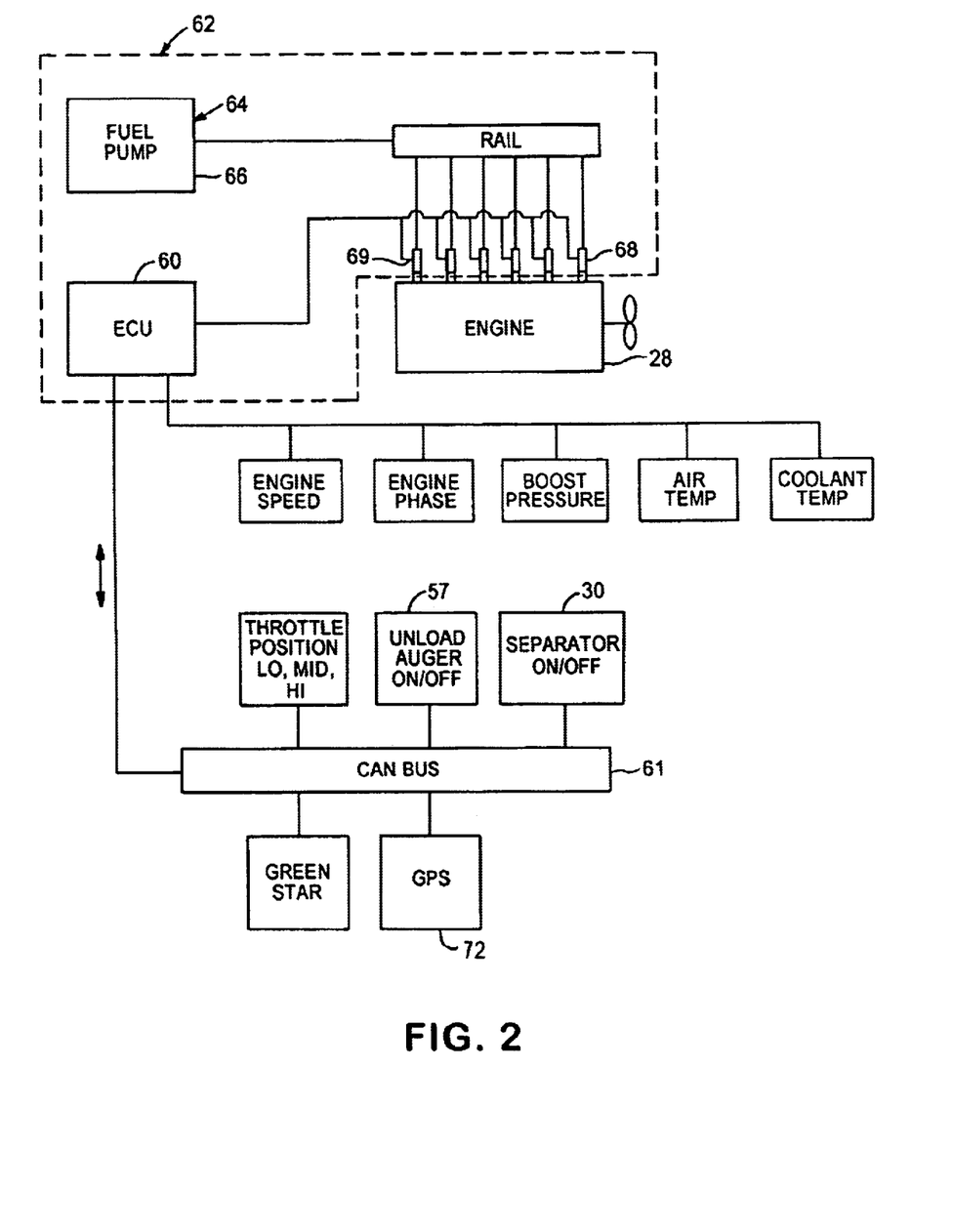
FIG. 2 shows a semi-schematic block diagram illustrating various operating systems which affect operation of engine control systems of the invention.

For example, and referring to FIG. 2, an engine power control system 62 includes engine control unit 60 and a fuel system 64, operating in combination with the engine control unit to control quantity of fuel fed to engine 28, thus to control power output of the engine. Fuel system 64 includes a fuel pump 66 and a plurality of injectors 68 which inject fuel into the cylinders of the engine. Thus, the engine power control system 62 includes engine control unit 60, fuel pump 66, injectors 68, and adjustment apparatus 69 at the injectors. Engine control unit 60 provides an ongoing stream of control signals, closely spaced in time, controlling adjustment apparatus 69 of the injectors, thus to control the rate of fuel flow to engine 28.

As indicated above, conventional engine power control systems operate in a reactionary mode with a nominal objective of maintaining constant engine speed. The primary tool for maintaining engine speed constant is sensing changes in engine speed, and adjusting fuel flow rate in response to such speed changes. Typically, a range of engine speeds, for example between 2100 rpm and 2300 rpm, is targeted for routine operation, optionally with a specific target speed of e.g. about 2200 rpm.

So long as the engine speed remains within the limits of the target range of speeds, the fuel flow rate can be maintained constant. In some alternate embodiments, the engine control unit can adjust fuel flow any time the engine speed deviates, even nominally, from the specific target speed. In such instance, and considering the lag time between change of fuel flow rate and change of engine power output, the engine control unit is constantly adjusting the fuel flow rate, searching for the target speed.

In either case, when an increased load is applied to the engine, engine speed decreases. When the engine speed decreases below the lower limit of the target range, or below the specific target speed, the electronic control unit senses the speed change and reacts to the engine speed change by increasing the rate of fuel flow to the combustion chambers of the engine, thus increasing the amount of power developed by the engine. However, since the ECU responds only after the engine speed has changed, any objective of maintaining constant engine speed is defeated by the very design of the power control system. Where the load change is sudden and/or substantial, the response of the electronic control unit can be too slow to maintain adequate power output to meet the entire change in the load, whereby the load change can have a negative impact on engine speed. If the load change is substantial, engine speed may be substantially impacted. Since all systems on the combine are designed to operate at rated engine speed, any time engine speed declines substantially, efficiency of the various functions of the combine are negatively affected.

Figure 3:
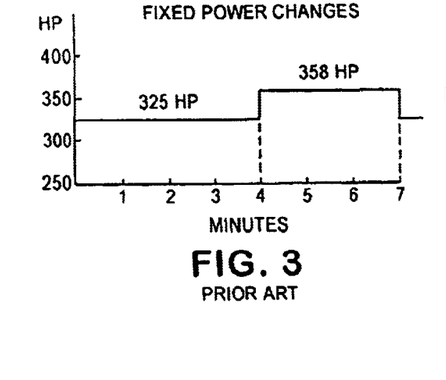
FIG. 3 is a graph representing a prior art, fixed magnitude, step power boost associated with activation and deactivation of the unloading auger.

FIG. 3 represents a power curve of a prior art engine power control system which automatically increases fuel flow rate, and thus boosts engine power output by a fixed amount, any time the unloading system is in operation, and correspondingly decreases fuel flow rate by a like amount when the unloading auger is switched from active operation to off. FIG. 3 illustrates a power boost of about 33 horsepower, from 325 horsepower to 358 horsepower.

Figure 4:
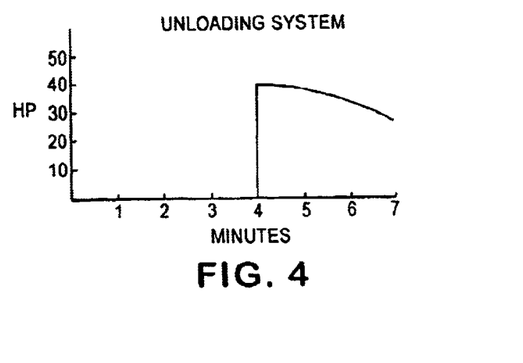
FIG. 4 is a graph representing power demands imposed by the unloading system.

FIG. 4 is a graph which illustrates that the power demand from the unloading system starts at about 40 horsepower, and tapers to about 28 horsepower by the time the grain tank is substantially empty. Referring to the above, the 33 added horsepower illustrated in FIG. 3 is less than the power demand of 40 horsepower illustrated in FIG. 4, whereby engine speed can decrease perceptibly when the unloading system is switched on. As unloading progresses, with constant fuel flow and decreasing unloading power demand, engine speed increases gradually. Then, when the unloading system is turned off, engine speed can, and sometimes does, increase momentarily until fuel flow is decreased to correspond with the decreased power demand. Thus, using the load management system of FIG. 3, the engine is sometimes perceived as being underpowered when the unloading system is turned on, and wherein engine speed declines, and the engine can appear to "race" momentarily when the unloading system is turned off. Customer perception, by contrast, prefers constant engine speed, which portrays a message of constant and predictable engine power.

Figure 5:
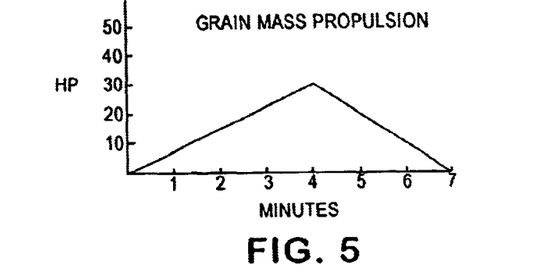
FIG. 5 is a graph representing change in power required to propel the vehicle while experiencing respective changing levels of grain in the grain tank.

FIG. 5 is a graph which illustrates, as a straight-line graph, typical incremental increases, closely spaced in time, such as several times per second, in the amount of power required to propel the combine, as a land vehicle, across a field as grain is added to the grain tank, and the subsequently decreasing amount of power required to propel the combine across the field as grain is removed from the grain tank by the unloading auger. As illustrated in FIG. 5, the maximum propulsion requirement increment is typically about 30 horsepower. The actual horsepower related to propulsion, of course, is highly dependent on ground and terrain conditions.

Figure 6:
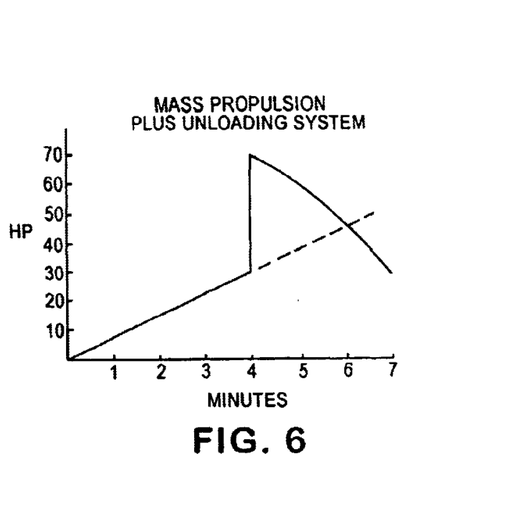
FIG. 6 is a graph representing the combined changes in power imposed by ongoing changes in mass of crop material in the grain tank, and on-and-off power requirements associated with operation of the unloading auger for unloading the crop material from the grain tank.

Referring to FIGS. 4–6, the entire process of loading the grain tank and unloading the grain tank can take as little as 7 minutes from start to finish. In that regard, starting with an empty grain tank, and assuming maximum capacity throughput of grain received, the grain tank can be filled in as little as 4 minutes. That 4 minutes is represented in FIG. 5 as the peak of the upwardly-sloping straight-line curve. Upon reaching the point where the grain tank is filled, unloading is begun by switching on the unloading system, which expels the grain from the combine at auger 58. As the mass of grain in the grain tank decreases, so does the amount of power required to propel, through the field, the grain in the tank. Correspondingly, as the amount of grain in the tank decreases, the grain becomes easier to move, whereby the power demand of the unloading system decreases as illustrated in FIG. 4.

FIG. 6 shows a super-position of the unloading system power requirements and the grain mass propulsion requirements of FIGS. 4 and 5, thus to illustrate the overall power requirement imposed on the engine by the movement of grain into and out of the grain tank.

Figure 7:
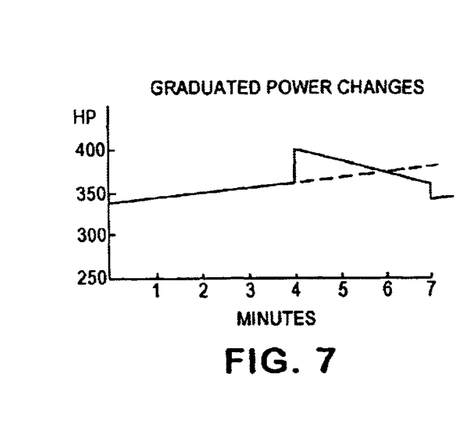
FIG. 7 is a graph of graduated power changes.

Referring now to FIG. 7, and one expression of the invention, a memory unit of engine control unit 60 is programmed with a power curve or an algorithm of a power curve representing anticipated predetermined operating conditions such that a corresponding power curve or power curve algorithm, or combination of power curve and algorithm compensates at least in part, in fuel flow to the engine, for anticipated changes in loads being placed on the engine. The left axis of FIG. 7 represents the start of a loading cycle wherein the grain tank is empty, wherein the grain tank becomes fully loaded at time 4 minutes as indicated along the abscissa, and wherein the grain tank has been emptied at 7 minutes as indicated along the abscissa.

At the beginning of the 7 minute period, the engine is developing e.g. 340 horsepower. During the grain tank loading period, namely the first 4 minutes, the engine control unit commands a progressively changing magnitude, namely a gradually increasing fuel flow to the engine along a straight line path as indicated in FIG. 7, based on anticipated load increase, and without reliance on detecting any change in engine performance, to compensate for the anticipated increased load demand. By the time the grain tank is fully loaded, the engine power output will have prospectively increased gradually by 20 horsepower while the load demand will have increased gradually by about 30 horsepower. As a result, the engine speed will have decreased slightly, but the decrease will have been gradual and will not likely attract the attention of the operator.

When the unloading system is switched on, engine control unit 60 (FIG. 7) pro-actively provides a step increase of fuel flow to the engine, without reliance on detecting any change in engine performance, to provide for the step increase in power demand of the unloading system. The step increase in power output is illustrated in FIG. 7 as 40 horsepower, which matches rather well the anticipated initial 40 horsepower demand on the unloading system. However, as unloading progresses, the engine control unit decreases the rate of flow of fuel to the engine, represented by a downwardly sloping line in FIG. 7, to thus pro-actively adjust engine power output in anticipation of the predictable decrease in power demand on the engine from the unloading system and the propulsion system, without reliance on detecting any change in engine performance.

Again referring to FIG. 7, by the end of the unloading process, namely at 7 minutes after start of the process, engine power has been pro-actively reduced to 365 horsepower. At that point, the grain tank is empty, thus requiring substantially zero power from the engine for propulsion of grain. Correspondingly, the power demand of the unloading system has declined to about 30 horsepower. With the grain tank empty, the unloading system is turned off. As the unloading system is turned off, the engine control unit pro-actively reduces fuel flow rate to the engine without reliance on detecting any change in engine performance, thereby reducing engine power by 25 horsepower, to 340 horsepower, whereupon the cycle can be repeated, starting from 340 horsepower. The approximate 25 horsepower reduction in engine power approximates the 30 horsepower reduction in load demand, whereby engine speed remains relatively constant.

The above description of the process of a grain tank fill/unload cycle provides a simplistic illustration of use of a power curve of the invention based on an assumed grain fill rate, an assumed grain unloading rate, and an assumption that no other operating system imposes any substantial load changes. Such power curve can be predicted and is graphed as in FIG. 7.

In the alternative, the assumed 7 minute cycle may be different under less than optimum harvesting or yield conditions. Where the cycle time is different, the anticipated cycle time can be set by the operator, thus to modify the power curve with a human-determined change, whereupon the engine control unit sets the rate of increase of engine power accordingly, namely the slope of the up-trending line in FIG. 7, so that engine power output reaches 360 horsepower at the time when the grain tank is expected to be full. The engine power is then boosted to 400 horsepower when the unloading system is switched on, and is decreased as before described during the unloading time.

In the alternative, ECU 60 can be programmed to be trained according to historical experience, thereby to modify the power curve. Such training of the ECU is taught in U.S. Pat. No. 5,586,033 to Hall issued Dec. 17, 1996, and is herein incorporated by reference in its entirety.

Further, such power curve can be developed or modified by a suitable algorithm which applies a variety of sensor inputs to a continuing series of calculations of desired fuel flow rate. Such sensor inputs include grain mass in tank 26, grain mass fill rate, grain moisture, grain density, and changes in slope of the terrain as sensed by the GREENSTAR® system.

Still referring to FIG. 7, during the grain tank fill time, the ECU outputs an ongoing series of control signals commanding relatively smaller incremental changes inputs of fuel flow rate into the engine A relatively greater step-change input is commanded when the unloading system is turned on, and again when the unloading system is turned off. Also, a series of control signals commanding relatively smaller incremental change inputs are generated during grain tank unloading, represented by the downward-sloping line segment. Of course, any auxiliary function whose operation can be directly controlled or reliably predicted, or which can be taught to ECU 60, such as unloading system operation, can be included in the pro-active engine control algorithm.

In addition to the projected grain tank fill rate, and operation of the unloading system, a number of other factors can affect the sum of the loads placed on the engine at any given point in time. In addition, some provision should be made for starting a loading or unloading process with some grain already in the grain tank.

Thus, in preferred embodiments of the invention, engine control unit 60 receives additional inputs from various sensors on the combine which indicate anticipated load changes being imposed on the engine, or about to be imposed on the engine. For example, a load sensor in the grain tank can indicate the actual quantity of grain in the grain tank. A grain tank mass fill rate sensor 70 such as taught in U.S. Pat. No. 5,686,671 issued Nov. 11, 1997 to Nelson et al, herein incorporated by reference, can be used to indicate, to the engine control unit, actual mass fill rate in place of the assumed fill rate. A grain moisture sensor can feed grain moisture information to the CAN bus, thereby to adjust the assumed weight of the mass of grain in the grain tank. A global positioning system 72 on the combine can predict the slope of the terrain immediately ahead of the combine, thus to predict the propulsion power required to traverse such terrain, and can feed such slope information to the engine control unit.

The engine control units of this invention receive such information relating to present and anticipated power requirements, separate from engine speed sensing, use such information to calculate impending engine power demands, and adjust fuel flow rate to the engine thereby to adjust the engine power output to the additive sum of the loads which can be thus predicted. Thus, in preferred embodiments, the idealistic curve of power output illustrated in FIG. 7 is modified according to actual sensory inputs to the engine control unit, whereby the engine control unit dynamically increases or decreases fuel flow to the engine according to real-time anticipated power demands.

The above anticipatory portion of the engine power control system attempts to anticipate all changes in power demands on the engine, as well as engine power output, thus to supply power changes as the demand changes are being implemented, so that the engine speed is maintained at a relatively constant value within the target engine speed range. In such effort, the ECU monitors a variety of relevant parameters such as present engine speed, engine phase, boost pressure in the fuel system, air temperature, coolant temperature, throttle position, and the like, and includes relevant calculations for each in the power curve algorithm. Where available, the data collected by the GREENSTAR® system is also made available to the ECU.

However, it is anticipated that no pre-planned expectation of power demand can anticipate all the demand changes which will be imposed on the engine. Accordingly, in preferred embodiments, the engine control unit receives sensor inputs from a variety of input sensors and adjusts fuel flow rate pro-actively based on the combination of inputs so received. Thus, engine control units of the invention also operate the conventional reactive algorithm in parallel with the anticipatory, or pro-active algorithm or power curve. Under such reactive algorithm or power curve, if the power demand is not satisfied by the anticipatory compensation algorithm, such that the engine speed moves outside the target speed range, the conventional reactive parameter algorithm is engaged, and takes over fuel flow decisions until such time as the engine speed is again in the target speed range. Once the engine speed is again within the target speed range, the reactive parameters in the engine control unit cease to function and the anticipatory, pro-active parameters again take over control of engine speed.

Thus, where a target engine speed range is identified to the engine control unit, the anticipatory engine power changes can be directed toward providing sufficient engine power to handle anticipated load changes, thereby maintaining the engine speed within the target range based on sensor inputs other than deviations of the engine speed from the target range. Fuel feed rates based on such anticipated load changes are changed independent of whether or not the anticipated load change actually takes place.

Where the anticipatory power changes do not maintain the engine power within the target range, such as when an unanticipated load is imposed on the engine, the reactive power adjustments take over and return the engine power output engine speed into balance with the load demands, whereupon the reactive power adjustment parameter is disengaged for such period of time until the engine speed again deviates from the target engine speed range.

While the pro-active power curves and algorithms of the invention do not respond to changes in engine speed per se, such pro-active power curves and algorithms can consider, and thus respond to, instantaneous engine speed as part of the pro-active algorithm calculation.

Further, where the engine control unit uses a combination of pro-active and reactive algorithm calculations, the ECU necessarily combines such calculations in arriving at a respective fuel flow rate control signal. Thus, at some point in the control sequence, the ECU necessarily combines the pro-active and reactive inputs. Such combination can be as distinct and separate control signals emanating from respective distinct pro-active and reactive algorithms or curves. Such combination can be the result of mathematically combining separately calculated fuel flow rates. Such combination can be the result of combining the algorithms and using the combination algorithm to compute a single resultant fuel flow rate As used herein, "pro-active" as related to power changes means an action responsive to a sensed or predicted change of anticipated magnitude of a parameter other than engine speed change.

As used herein, "reactive" as related to power changes means an action responsive to engine speed change.

As used herein, a "predetermined operating condition" defines a condition which is responded to. The magnitude of such condition can be assumed, as in a fixed power curve, or can be sensed in real time, whereby the magnitude of the condition is processed through a suitable power curve algorithm.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. In an engine-driven vehicle, an engine power control system controlling the power output of the engine, said engine power control system comprising:

(a) a fuel system including a fuel supply pump and adjustment apparatus which adjusts the rate at which fuel is delivered to combustion chambers of the engine in response to control signals supplied to an input of the adjustment apparatus, thereby to adjust power output of the engine; and (b) an electronic engine controller capable of generating, and delivering to the adjustment apparatus, a series of control signals which cause the adjustment apparatus to change the rate at which fuel is delivered to the combustion chambers thereby to change the power output of the engine, the electronic engine controller having at least one of a power curve or an algorithm for a power curve stored in memory which, responsive to certain predetermined operating conditions other than sensed engine speed, provides a sequence of pro-active change inputs, at predetermined rates of change, in quantity of fuel delivered to the engine combustion chambers, at points in time based on timing of occurrence of the respective operating conditions, thereby to produce pro-active incremental changes in power output of the engine, which pro-active incremental power changes are effected in anticipation of changes in load demand on the engine, and which pro-active incremental power changes generally correspond with expected incrementally progressive changes in load demand on the engine.

2. An engine power control system as in claim 1, the vehicle having an auxiliary function powered by the engine, the auxiliary function being capable of being operated while the vehicle is moving, the engine power control system further comprising a switch operable for activating and deactivating the auxiliary function in a step-wise manner, the stored power curve or algorithm for the power curve, in response to activation and deactivation of the switch, providing pro-active relatively greater step change inputs in quantity of fuel delivered to the engine combustion chambers, at points in time based on timing of the activations and deactivations of the switch, while simultaneously and additively providing pro-active relatively smaller incremental change inputs in quantity of fuel delivered to the engine combustion chambers at points in time based on timing of the respective certain pre-determined operating conditions other than the auxiliary function, whereby the power curve or algorithm so employed by the electronic engine controller provides an additive combination of pro-active relatively greater step change inputs, and proactive relatively smaller increment change inputs, in power output of the engine in anticipation of changing load demands on the engine.

3. An engine power control system as in claim 1 wherein the power curve or algorithm is responsive to one or more operating condition selected from the group consisting of mass quantity of grain in a grain tank on the vehicle, grain tank mass fill rate, grain moisture, density of grain being received in the grain tank, and changes in slope of terrain over which the vehicle is moving.

4. An engine power control system as in claim 2 wherein the power curve or algorithm is responsive to one or more operating condition selected from the group consisting of mass quantity of grain in a grain tank on the vehicle, grain tank mass fill rate, grain moisture, density of grain being received in the grain tank, and changes in slope of terrain over which the vehicle is moving.

5. An engine power control system as in claim 4 wherein a second said predetermined operating condition to which the power curve or algorithm is responsive comprises the auxiliary function and wherein the auxiliary function comprises activation and deactivation of an unloading auger unloading grain from the grain tank, and whereby pro-active step-wise changes in power are effected based on anticipated load changes on the engine related to starting, operating, and stopping operation of the unloading auger by operation of the switch.

6. An engine power control system as in claim 1 wherein the power curve or algorithm includes (i) a first upwardly sloping line representing a first set of small incremental increases in engine power, over a first period of time, in anticipation of increasing grain load in a grain tank on the vehicle over the respective period of time, (ii) a second relatively greater magnitude step change increase in engine power effected in anticipation of increased load on the engine and implemented when a grain unloading auger on the vehicle is activated to unload grain from the grain tank, (iii) a third relatively smaller, downwardly sloping line representing a second set of small incremental decreases in engine power over a second period of time, in anticipation of decreased load on the engine over a subsequent period of time while the auger is unloading grain from the grain tank, and (iv) a fourth relatively greater magnitude step change decrease in engine power effected in anticipation of decreased load on the engine and implemented when the grain unloading auger is deactivated.

7. In an engine-driven vehicle, an engine power control system controlling the power output of the engine, said engine power control system comprising:

(a) a fuel system including a fuel supply pump and adjustment apparatus which adjusts the rate at which fuel is delivered to combustion chambers of the engine in response to control signals supplied to an input of the adjustment apparatus, thereby to adjust power output of the engine; and (b) an electronic engine controller capable of generating, and delivering to the adjustment apparatus, a series of control signals which cause the adjustment apparatus to change the rate at which fuel is delivered to the combustion chambers thereby to change the power output of the engine, the electronic engine controller having at least one of a power curve or an algorithm for a power curve stored in memory, the power curve or algorithm changing quantity of fuel delivered to the combustion chambers of the engine according to a combination of (i) a first parameter defining pro-active change inputs based on anticipated engine loading changes, and (ii) a second parameter defining reactive change inputs responsive and reactive to sensed engine-loading changes not satisfied by the first pro-active parameter.

8. An engine power control system as in claim 7, the vehicle having an auxiliary function powered by the engine, the auxiliary function being capable of being operated while the vehicle is moving, the engine power control system further comprising a switch operable for activating and deactivating the auxiliary function in a step-wise manner, the stored power curve or algorithm for the power curve, in response to activation and deactivation of the switch, providing pro-active relatively greater step change inputs in quantity of fuel delivered to the engine combustion chambers based on the first parameter, at points in time based on timing of the activations and deactivations of the switch, while simultaneously and additively providing pro-active relatively smaller incremental change inputs in quantity of fuel delivered to the engine combustion chambers based on the first parameter, at points in time based on timing of certain pre-determined operating conditions other than the auxiliary function, whereby the power curve or algorithm so employed by the electronic engine controller provides an additive combination of pro-active relatively greater step change inputs based on the first parameter, proactive relatively smaller increment change inputs based on the first parameter, and reactive change inputs based on sensed engine-loading, in dynamically controlling power output of the engine.

9. An engine power control system as in claim 7 wherein the power curve or algorithm is responsive to one or more predetermined operating conditions selected from the group consisting of mass quantity of grain in a grain tank on the vehicle, grain tank mass fill rate, grain moisture, density of grain being received in the grain tank, and changes in slope of terrain over which the vehicle is moving.

10. An engine power control system as in claim 9 wherein a second predetermined operating condition to which the power curve or algorithm is responsive comprises the auxiliary function and wherein the auxiliary function comprises activation and deactivation of an unloading auger unloading grain from the grain tank, and whereby pro-active step-wise increases in power are effected based on anticipated load changes on the engine related to starting, operating, and stopping operation of the unloading auger by operation of the switch.

11. An engine power control system as in claim 7 wherein the first parameter includes (i) a first upwardly sloping line representing a first set of small incremental increases in engine power over a first period of time, in anticipation of increasing grain load in a grain tank on the vehicle over the respective period of time, (ii) a second relatively greater magnitude step change increase in engine power effected in anticipation of increased load on the engine and implemented when a grain unloading auger on the vehicle is activated to unload grain from the grain tank, (iii) a third relatively smaller, downwardly sloping line representing a second set of small incremental decreases in engine power over a second period of time, in anticipation of decreased load on the engine over a subsequent period of time while the auger is unloading grain from the grain tank, and (iv) a fourth relatively greater magnitude step change decrease in engine power effected in anticipation of decreased load on the engine and implemented when the grain unloading auger is deactivated.

12. In an engine-driven vehicle wherein an engine power control system comprises a fuel system including a fuel supply pump and adjustment apparatus which adjusts the rate at which fuel is delivered to combustion chambers of the engine in response to control signals applied to an input of the adjustment apparatus, thereby to adjust power output of the engine, the vehicle including an electronic engine controller capable of generating, and delivering to the adjustment apparatus, a series of control signals which cause the adjustment apparatus to change the rate at which fuel is delivered to the combustion chambers thereby to change the power output of the engine, the electronic engine controller having at least one of a power curve or an algorithm for a power curve stored in memory, effective to control fuel input to the engine, a method of controlling power output of the engine, comprising providing a sequence of pro-active change inputs of progressively changing magnitude, in quantity of fuel delivered to the engine combustion chambers, at points in time based on timing of occurrence of the respective operating conditions, thereby producing pro-active changes, of progressively changing magnitude, in power output of the engine in anticipation of expected changes in load demand on the engine, and which pro-active power output changes generally correspond with expected progressive changes in load demand on the engine.

13. A method as in claim 12, the vehicle having an auxiliary function powered by the engine, the auxiliary function being capable of being operated while the vehicle is moving, the engine power control system further comprising a switch operable for activating and deactivating the auxiliary function in a step-wise manner, the method further comprising, in response to activation and deactivation of the switch, providing pro-active relatively greater step change inputs in quantity of fuel delivered to the engine combustion chambers, at points in time based on timing of the activations and deactivations of the switch, while simultaneously and additively providing pro-active relatively smaller incremental change inputs in quantity of fuel delivered to the engine combustion chambers at points in time based on timing of the respective certain determined operating conditions other than the auxiliary function, thereby providing an additive combination of pro-active relatively greater step change inputs, and proactive relatively smaller increment change inputs, in power output of the engine in anticipation of changing load demands on the engine.

14. A method as in claim 12 comprising providing the sequence of proactive change inputs in response to one or more predetermined operating conditions selected from the group consisting of mass quantity of grain in a grain tank on the vehicle, grain tank mass fill rate, grain moisture, density of grain being received in the grain tank, and changes in slope of terrain over which the vehicle is moving.

15. A method as in claim 12 and further comprising sensing slope of terrain immediately ahead of the vehicle, and providing, as a component of the pro-active change inputs, a change increment responsive to the sensed slope of the terrain immediately ahead of the vehicle.

16. A method as in claim 12 comprising providing the sequence of proactive change inputs in response to anticipated grain tank mass fill rate, whereby pro-active incremental increases in power are effected based on anticipated rate of grain entering the tank.

17. A method as in claim 16, further comprising providing the sequence of proactive change inputs in response to a second predetermined operating condition comprising activation and deactivation of an unloading auger unloading grain from the grain tank, thereby to effect pro-active step-wise changes in power based on anticipated load changes on the engine related to starting, operating, and stopping operation of the unloading auger.

18. A method as in claim 12, further comprising
  (i) providing a first set of relatively smaller magnitude incremental increases in engine power, over a first period of time, in anticipation of increasing grain load in a grain tank on the vehicle over the respective first period of time,
  (ii) providing a second relatively greater magnitude step change increase in engine power, effected in anticipation of increased load on the engine, and implemented when a grain unloading auger on the vehicle is activated to unload grain from the grain tank,
  (iii) providing a third set of relatively smaller magnitude incremental decreases in engine power over a second period of time in anticipation of decreased load on the engine over a subsequent period of time while the auger is unloading grain from the grain tank, and
  (iv) providing a fourth relatively greater magnitude step change decrease in engine power effected in anticipation of decreased load on the engine, and implemented when the grain unloading auger is deactivated.

19. In an engine-driven vehicle wherein an engine power control system comprises a fuel system including a fuel supply pump and adjustment apparatus which adjusts the rate at which fuel is delivered to combustion chambers of the engine in response to control signals applied to an input of the adjustment apparatus, thereby to adjust power output of the engine, the vehicle including an electronic engine controller capable of generating, and delivering to the adjustment apparatus, a series of control signals which cause the adjustment apparatus to change the rate at which fuel is delivered to the combustion chambers thereby to change the power output of the engine, the electronic engine controller having at least one of a power curve or an algorithm for a power curve stored in memory, effective to control fuel input to the engine, a method of controlling power output of the engine, comprising providing a sequence of change inputs, in quantity of fuel delivered to the engine, according to a combination of (i) a first parameter defining pro-active change inputs based on anticipated engine loading changes, and
  (ii) a second parameter defining reactive change inputs responsive and reactive to sensed engine loading changes not satisfied by the first pro-active parameter.

20. A method as in claim 19, the vehicle having an auxiliary function powered by the engine, the auxiliary function being capable of being operated while the vehicle is moving, the engine power control system further comprising a switch operable for activating and deactivating the auxiliary function in a step-wise manner, the method further comprising, in response to activation and deactivation of the switch, providing pro-active relatively greater step change inputs in quantity of fuel delivered to the engine combustion chambers based on the first parameter, at points in time based on timing of the activations and deactivations of the switch, while simultaneously and additively providing pro-active relatively smaller incremental change inputs in quantity of fuel delivered to the engine combustion chambers based on the first parameter at points in time based on timing of the respective certain determined operating conditions other than the auxiliary function, thereby providing an additive combination of pro-active relatively greater step change inputs based on the first parameter, proactive relatively smaller increment change inputs based on the first parameter, and reactive change inputs based on the second parameter of sensed engine-loading, in dynamically-controlling power output of the engine.

21. A method as in claim 19 comprising providing the sequence of proactive change inputs in response to one or more predetermined operating conditions selected from the group consisting of mass quantity of grain in a grain tank on the vehicle, grain tank mass fill rate, grain moisture, density of grain being received in the grain tank, and changes in slope of terrain over which the vehicle is moving.

22. A method as in claim 21, further comprising providing the sequence of proactive change inputs in response to a second predetermined operating condition comprising activation and deactivation of an unloading auger unloading grain from the grain tank, thereby to effect pro-active step-wise changes in power based on anticipated load changes on the engine related to starting, operating, and stopping operation of the unloading auger.

23. A method as in claim 19, wherein the first parameter comprises
  (i) providing a first set of relatively smaller magnitude incremental increases in engine power, over a first period of time, in anticipation of increasing grain load in a grain tank on the vehicle over the respective first period of time,
  (ii) providing a second relatively greater magnitude step change increase in engine power, effected in anticipation of increased load on the engine, and implemented when a grain unloading auger on the vehicle is activated to unload grain from the grain tank,
  (iii) providing a third set of relatively smaller magnitude incremental decreases in engine power over a second period of time in anticipation of decreased load on the engine over a subsequent period of time while the auger is unloading grain from the grain tank, and
  (iv) providing a fourth relatively greater magnitude step change decrease in engine power effected in anticipation of decreased load on the engine and implemented when the grain unloading auger is deactivated.

* * * * *